US012776240B2

(12) United States Patent
Kim et al.

(10) Patent No.: US 12,776,240 B2
(45) Date of Patent: Oct. 27, 2026

(54) DATA DRIVING DEVICE

(71) Applicant: LX SEMICON CO., LTD., Daejeon (KR)

(72) Inventors: Won Kim, Daejeon (KR); Se Hong Oh, Daejeon (KR); Beom Rak Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/500,530

(22) Filed: Nov. 2, 2023

(65) Prior Publication Data

US 2024/0153432 A1 May 9, 2024

(30) Foreign Application Priority Data

Nov. 3, 2022 (KR) ........................ 10-2022-0145159

(51) Int. Cl.
*G09G 3/20* (2006.01)

(52) U.S. Cl.
CPC ..... *G09G 3/2092* (2013.01); *G09G 2310/027* (2013.01); *G09G 2310/0291* (2013.01); *G09G 2330/021* (2013.01)

(58) Field of Classification Search
None
See application file for complete search history.

(56) References Cited

U.S. PATENT DOCUMENTS 10,217,393 B2 * 2/2019 Noh ........................ H03M 1/74
10,388,223 B2 * 8/2019 Brahma ............... G09G 3/3258
2012/0038614 A1 2/2012 Mizumaki
2016/0372028 A1 * 12/2016 Park ..................... G09G 3/2096
2017/0116948 A1 * 4/2017 Wen ...................... G09G 3/3685
2018/0158408 A1 * 6/2018 Chae ..................... G09G 3/3233
2020/0286448 A1 * 9/2020 Kim ......................... G09G 5/18
2021/0366343 A1 * 11/2021 Oh ....................... G09G 3/2003
2022/0351703 A1 * 11/2022 Kim ......................... G09G 5/18
2023/0252956 A1 * 8/2023 Kim ......................... G09G 5/10
345/204

OTHER PUBLICATIONS

Extended European Search Report issued for EP Application No. 23206982.3, issued on Mar. 7, 2024, 11 pages.

* cited by examiner

*Primary Examiner* — Sarvesh J Nadkarni
(74) *Attorney, Agent, or Firm* — ROTHWELL, FIGG, ERNST & MANBECK, P.C.

(57) ABSTRACT

An embodiment provides a data driving device that varies a bias current of an amplifier to prevent noise generated when a digital-to-analog conversion circuit converts a digital signal for a grayscale value into an analog signal from being propagated to a pixel.

18 Claims, 7 Drawing Sheets

DATA DRIVING DEVICE

CROSS-REFERENCE TO RELATED APPLICATIONS

The present application claims the benefits of priority to Korean Patent Application No. 10-2022-0145159, filed on Nov. 3, 2022, the disclosure of which is incorporated herein by reference in its entirety.

BACKGROUND

1. The Field

The embodiment relates to a data driving device for driving pixels of a display panel.

2. Description of the Related Art

A plurality of pixels are disposed on the display panel. The brightness of each pixel can be controlled using a backlight and liquid crystal, or can be controlled using power flowing to a self-light emitting device such as OLED (Organic Light Emitting Diode).

The display device can comprise a driving device capable of adjusting the brightness of each pixel. The driving device can adjust the brightness of each pixel by adjusting the degree of opening and closing of the liquid crystal or by adjusting the amount of power supplied to the self-light emitting device.

The driving device can supply a data voltage corresponding to a grayscale value of each pixel to each pixel. Depending on the data voltage in each pixel, the degree of opening and closing of the liquid crystal can be adjusted or the amount of current supplied to the self-emitting device can be adjusted. In terms of supplying the data voltage, the aforementioned driving device is also called a data driving device. In addition, a driving transistor can be disposed in each pixel, and a data voltage can be supplied to a source terminal of the driving transistor. In this respect, the data driving device is also called a source driver. In addition, in the data driving device, one channel can drive a plurality of pixels constituting one line along the vertical direction. In this respect, the data driving device is also called a column driver.

The data driving device can drive one line for each horizontal line at each predetermined horizontal time period. For example, the data driving device can drive pixels of a first horizontal line during a first horizontal time period and drive pixels of a second horizontal line during a second horizontal time period subsequent to the first horizontal time period.

The data driving device can change the size of the data voltage supplied to the display panel according to the grayscale value of each line pixel at a point in time of each horizontal time period. For example, the data driving device supplies a first data voltage to the display panel during the first horizontal time period, and then changes the first data voltage to a second data voltage at the start point in time of the second horizontal time period and supply it to the display panel.

Power consumption in the data driving device can greatly increase mainly in the process of changing the data voltage. However, since this increase occurs instantaneously, noise can occur due to instantaneous power consumption in the data driving device. Since this noise can propagate along the ground and most of the components constituting the display device share the ground, this noise can be a serious factor that causes a defect in the display device.

SUMMARY

Against this background, an object of the embodiment is, in one aspect, to provide a technique for minimizing the occurrence of the above-mentioned noise or reducing the intensity of the above-mentioned noise. In another aspect, an object of an embodiment is to provide a technique for blocking or minimizing propagation of the aforementioned noise.

In order to achieve the above object, in one aspect, a data driving device, comprising: a latch circuit configured to store pixel image data; a digital-to-analog conversion circuit configured to convert a digital signal corresponding to the pixel image data into an analog signal using a plurality of gamma voltages; a buffer circuit configured to vary the magnitude of a bias voltage within one horizontal time period and to transfer the analog signal for driving a pixel to the pixel; and an output switch configured to control a connection between a data line connected to the pixel and the buffer circuit.

The buffer circuit is configured to reduce the magnitude of a bias current according to the bias voltage during a first time period of the one horizontal time period.

In the other aspect, a data driving device, comprising: a digital-to-analog conversion circuit configured to convert a digital signal for a grayscale value into an analog signal; and a buffer circuit, wherein the buffer circuit is configured: to control the magnitude of the bias voltage to a first magnitude at a first time period of one horizontal time period, to control the magnitude of the bias voltage to a second magnitude at a second time period of the one horizontal time period, and to transfer the analog signal for driving a pixel to the pixel.

The magnitude of the bias current at the first time period and the second time period can vary according to the control of the magnitude of the bias voltage.

In another aspect, a data driving device, comprising: a digital-to-analog conversion circuit configured to convert a digital signal for a grayscale value into an analog signal for driving a pixel; and a buffer circuit configured to amplify the analog signal using the amplifier while varying a slew rate of the amplifier within one horizontal time period.

As described above, according to the embodiment, it is possible to minimize the generation of noise due to instantaneous power consumption or to reduce the intensity of such noise. In addition, according to the embodiment, it is possible to block or minimize the propagation of such noise. In addition, according to the embodiment, by minimizing the influence of such noise, it is possible to minimize the defect of the display device, in particular, the image quality defect.

DETAILED DESCRIPTION OF THE EMBODIMENTS

Figure 1:
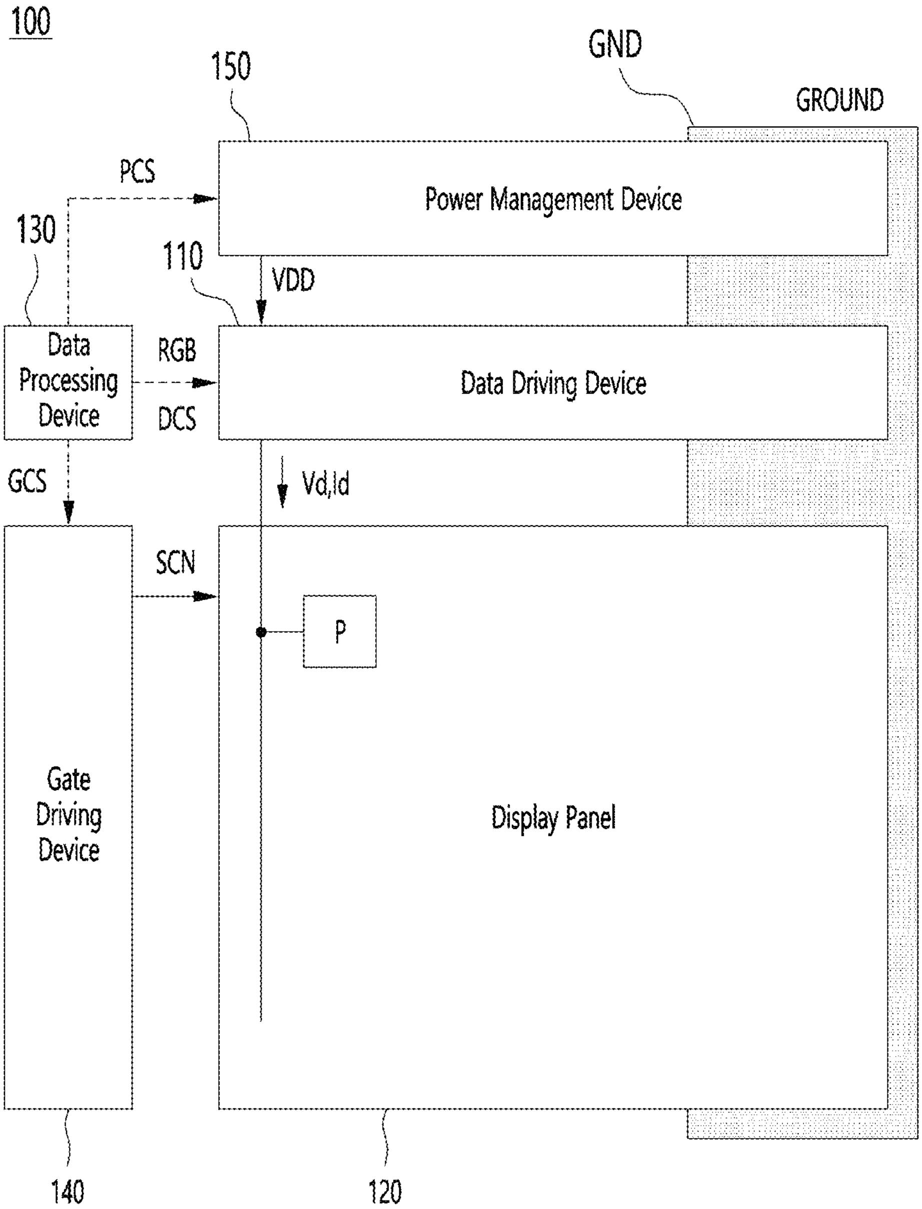
FIG. 1 is a configuration diagram of a display device according to an embodiment.

FIG. 1 is a configuration diagram of a display device according to an embodiment.

Referring to FIG. 1, a display device 100 can comprise a display panel 120, a data processing device 130, a gate driving device 140, a data driving device 110, and a power management device 150.

The display panel 120 can be a liquid crystal display (LCD) panel or can be a self-light emitting device panel such as an organic light emitting diode (OLED) panel.

When the display panel 120 is a liquid crystal display panel, the display panel 120 can comprise a backlight, liquid crystal, and a common electrode, and a pixel electrode and a driving transistor can be disposed in each pixel P. When the scan signal SCN is supplied to a gate terminal of the driving transistor, the driving transistor can be turned on and the data voltage Vd can be supplied to the pixel electrode. An electric field can be formed between the pixel electrode and the common electrode according to the data voltage Vd, and the alignment direction of the liquid crystals can be changed by the electric field. Accordingly, the degree of transmission of light supplied from the backlight can be changed so that the brightness of the pixel P can be adjusted.

A plurality of data lines and a plurality of gate lines can be arranged in a matrix on the display panel 120. The data line can be connected to a source terminal of the driving transistor of each pixel P, and the gate line can be connected to a gate terminal of the driving transistor of each pixel P. When the scan signal SCN is supplied to the gate line, the driving transistor can be turned on so that the data voltage Vd supplied through the data line can be transferred to the pixel electrode.

A parasitic capacitor can be formed in the data line. The parasitic capacitor can be formed between the data line and the common electrode or between the data line and the pixel electrode. From the standpoint of the data driving device 110 that supplies the data voltage Vd, the parasitic capacitor can be recognized as a load. As a capacitance of the parasitic capacitor increases, the data driving device 110 can supply a large amount of power to the data line.

The display panel 120 can be a self-light emitting device panel such as an OLED panel. In addition to the OLED panel, the self-light emitting device panel can use other types of self-light emitting devices such as a micro-LED panel.

A scan transistor, a driving transistor, an OLED, and the like can be disposed in each pixel P of the OLED panel. When the scan signal SCN is supplied to a gate terminal of the scan transistor, the scan transistor can be turned on, and the data voltage Vd can be supplied to the driving transistor through the scan transistor. In the OLED panel, the data voltage Vd can be supplied to the gate terminal of the driving transistor. The size of the conduction current of the driving transistor can be determined according to the size of the data voltage Vd. The brightness of the OLED connected to the driving transistor can be adjusted according to the size of the conduction current of the driving transistor.

A plurality of data lines and a plurality of gate lines can be arranged in a matrix form on the display panel 120. The data line can be connected to a source terminal of the scan transistor of each pixel P, and a drain terminal of the scan transistor can be connected to the gate terminal of the driving transistor of each pixel P. When the scan signal SCN is supplied to the gate terminal of the scan transistor through the gate line, the scan transistor can be turned on so that the data voltage Vd supplied through the data line can be transferred to the driving transistor.

A parasitic capacitor can be formed in the data line. The parasitic capacitor can be formed between the data line and the cathode electrode of the OLED or between the data line and the anode electrode of the OLED. From the standpoint of the data driving device 110 that supplies the data voltage Vd, the parasitic capacitor can be recognized as a load. As the capacitance of the parasitic capacitor increases, the data driving device 110 can supply a large amount of power to the data line.

The data processing device 130 can receive image data from an external device—for example, a device called a host or an application processor (AP). The data processing device 130 can convert the image data in the format of an external device into image data RGB in a format that the data driving device 110. The data processing device 130 can transmit the converted image data RGB to the data driving device 110.

The image data RGB can comprise pixel image data that represent grayscale values for pixels P. The pixel image data for one pixel can be, for example, digital data having 8 bits, and can represent grayscale values from 0 to 255. The data processing device 130 can generate pixel image data for each pixel P and transmit image data RGB including the pixel image data to the data driving device 110.

The data processing device 130 can transmit control signals DCS, GCS and PCS to devices involved in driving the display panel 120, for example, the data driving device 110, the gate driving device 140, and the power management device 150. The data processing device 130 can transmit the data control signal DCS to the data driving device 110, transmit the gate control signal GCS to the gate driving device 140, and transmit the power control signal PCS to the power management device 150.

The control signals DCS, GCS and PCS can comprise setting information for each device 110, 140, and 150. For example, the data processing device 130 can receive the setting information from an external device, check the setting information for each device 110, 140, and 150, and transmit the setting information by including it in the corresponding control signal DCS, GCS and PCS.

The control signals DCS, GCS, and PCS can comprise timing signals for controlling each of the devices 110, 140, and 150. The timing signals can be, for example, a vertical synchronization signal or a horizontal synchronization signal. The data driving device 110, the gate driving device 140, or the power management device 150 can classify frames according to the timing signals, and can classify each horizontal time period. In terms of controlling the timing of each device 110, 140, 150, the data processing device 130 is also called a timing controller.

The gate driving device 140 can supply the scan signal SCN to the pixels P disposed on the display panel 120. The pixels supplied with the scan signal SCN indicating turn-on can be selected, and the data voltage Vd can be supplied to the selected pixels.

The gate driving device 140 can supply the scan signal SCN through the gate line. A plurality of gate lines can be disposed on the display panel 120. Each gate line can be connected to pixels arranged in a row in one direction (e.g., a horizontal direction). The gate driving device 140 can supply a scan signal SCN indicating turn-on to one gate line among a plurality of gate lines. Accordingly, pixels connected to the corresponding gate line can be selected. The gate driving device 140 can supply a scan signal SCN indicating turn-on to the next gate line at every horizontal time period.

The power management device 150 can supply power to each of the devices 110, 130, and 140 constituting the display device 100. For example, the power management device 150 can supply a driving voltage to the data processing device 130, the gate driving device 140, and the data driving device 110. Each of the devices 110, 130, and 140 can drive internal circuits using this driving voltage.

The power management device 150 can supply power to parts that requires power for driving the pixel P. For example, when the display panel 120 is a liquid crystal display panel, the power management device 150 can supply a common voltage to a common electrode disposed on the display panel 120, and can supply a driving voltage (VDD in FIGS. 5 and 6) to the data driving device 110 so that the data voltage Vd can be supplied to the pixel electrode.

The data driving device 110 can drive the pixels P disposed on the display panel 120.

The data driving device 110 can receive image data RGB from the data processing device 130. The data driving device 110 can obtain pixel image data for each pixel P included in the image data RGB, generate a data voltage Vd corresponding to the pixel image data, and supply the data voltage Vd to each pixel P.

The pixel image data can indicate a grayscale value for each pixel P. The data driving device 110 can generate the data voltages Vd to correspond to these grayscale values.

The pixel image data can be stored in the latch circuit of the data driving device 110 and then output in the form of a digital signal. The data driving device 110 can convert pixel image data, which is a digital signal, into a data voltage Vd, which is an analog signal, using gamma voltages.

There is a difference between a grayscale corresponding to the brightness of an optical image and a grayscale corresponding to brightness perceived by humans. Compensating for this difference is called gamma conversion. When converting a digital signal into an analog signal, the data driving device 110 can simultaneously apply gamma conversion. For example, the data driving device 110 can use voltages used for digital-analog conversion as voltages to which gamma conversion is applied—gamma voltages—so that digital-analog conversion and gamma conversion can be simultaneously applied.

The analog signal may not be suitable for driving the pixel P due to its low power level. Thus, the data driving device 110 can amplify the analog signal to generate the data voltage Vd, and supply the data voltage Vd having a relatively high-power level to the pixel P.

When the data voltage Vd is supplied, the data current Id can flow. The size of the data current Id can vary depending on the state of the load, that is, the display panel 120. Most of the loads recognized by the data driving device 110 can be capacitive loads. From the standpoint of the data driving device 110, the pixel P is also a capacitive load, and the parasitic capacitor of the data line connected to the pixel P can also be a capacitive load.

In the case of a capacitive load, the size of the data current Id can vary according to the difference between the voltage of the previous state and the voltage to be supplied now. When the voltage difference is large, a large amount of data current Id flows, and when the voltage difference is small, a small amount of data current Id flows.

When the data driving device 110 can quickly increase and supply the data current Id, the data voltage Vd can be supplied at a desired level within a short period of time. Conversely, when the data driving device 110 cannot rapidly increase and supply the data current Id, a relatively long time can be required until the data voltage Vd is supplied at a desired level. Accordingly, the data driving device 110 can be developed in a form capable of quickly increasing the data current Id. However, when the data current Id increases rapidly, the size of noise appearing in the circuit can also increase.

The data driving device 110 and other devices can share a ground pattern GND. For example, the power management device 150, the data driving device 110, and the display panel 120 can share a ground pattern GND. According to this sharing, the ground noise appearing in the data driving device 110 can also affect the other devices 120 and 150. In addition, such ground noise can cause other devices 120 and 150 to malfunction or cause image quality to deteriorate.

The aforementioned data current Id is not the only source of ground noise. The data driving device 110 can convert a digital signal into an analog signal at each horizontal time period. At this time, noise can be generated even at a short moment when the corresponding conversion is performed, and such noise can affect the data voltage Vd.

A data driving device according to an embodiment applies a technology for minimizing generation and propagation of such noise.

Figure 2:
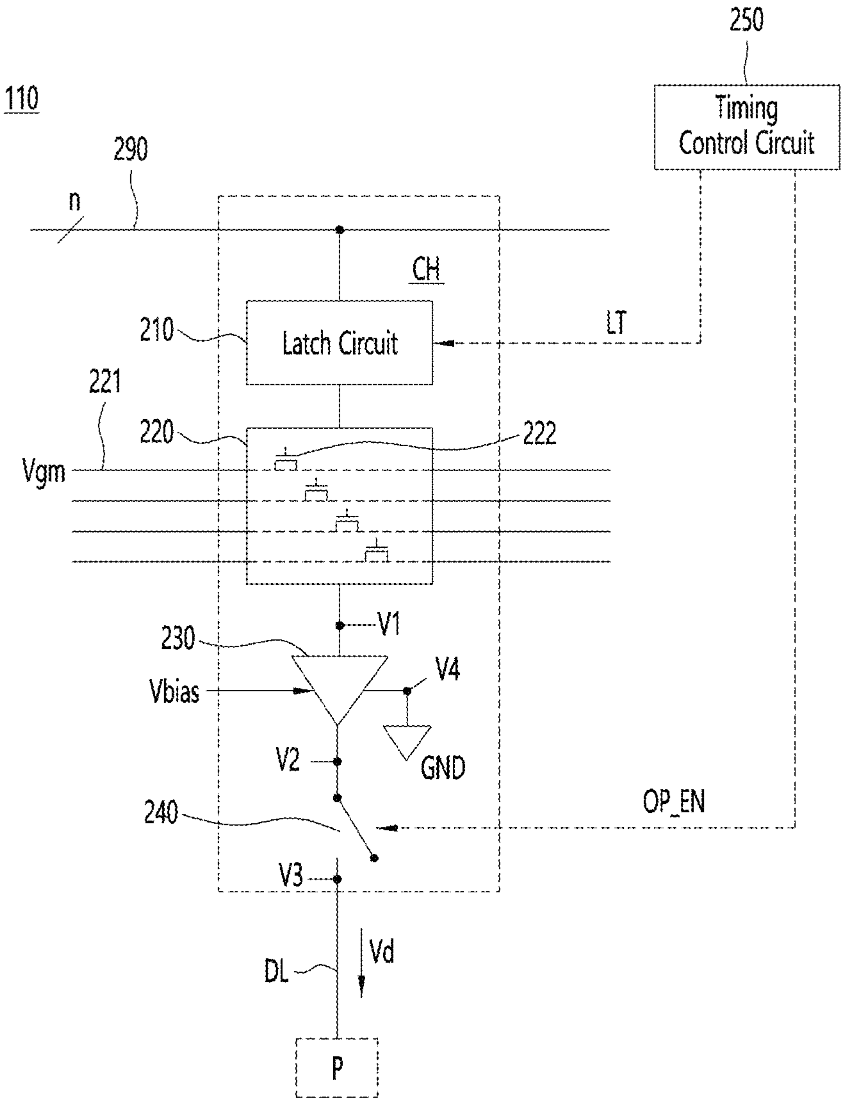
FIG. 2 is a configuration diagram of a data driving device according to an embodiment.

FIG. 2 is a configuration diagram of a data driving device according to an embodiment.

Referring to FIG. 2, the data driving device 110 can comprise a timing control circuit 250, a channel circuit CH, and a data bus line 290.

The data bus line 290 can consist of n (n is a natural number) lines. The data bus line 290 can be connected to the channel circuit CH, and the channel circuit CH can latch pixel image data received from the data bus line 290 one by one at every horizontal time period. Although only one channel circuit CH is shown in the figure, the data driving device 110 can have a plurality of channel circuits CH, and each channel circuit CH can comprise a shift register. Accordingly, each channel circuit CH can sequentially latch the pixel image data received from the data bus line 290.

The channel circuit CH can comprise a latch circuit 210, a digital-analog conversion circuit 220, a buffer circuit 230, an output switch 240, and the like.

The latch circuit 210 can store pixel image data received through the data bus line 290.

The latch circuit 210 can have two latches therein. The first latch can store pixel image data to be output at the next horizontal time period, and the second latch can store pixel image data to be output at the current horizontal time period. When the next horizontal time period arrives, pixel image data to be output at the next horizontal time period can be stored in the first latch, and the pixel image data stored in the first latch can be moved to and stored in the second latch.

An output timing of the latch circuit 210 can be determined according to the latch output signal LT generated by the timing control circuit 250 at every horizontal time period. The latch output signal LT can be synchronized with the horizontal synchronization signal. Alternatively, the phase of the latch output signal LT is different from that of the horizontal synchronization signal, but the length of the cycle can be the same.

The latch circuit 210 can output pixel image data stored in the latch circuit 210 in the form of a digital signal at every horizontal time period according to the latch output signal LT. These digital signals can be transmitted to the digital-to-analog conversion circuit 220.

The digital-to-analog conversion circuit 220 can convert a digital signal into an analog signal using gamma voltages Vgm.

A plurality of gamma voltage lines 221 can be disposed in the digital-to-analog conversion circuit 220, and gamma voltages Vgm corresponding to different grayscale values can be provided to each gamma voltage line 221. For example, a first gamma voltage corresponding to a first grayscale value can be provided to a first gamma voltage line, and a second gamma voltage corresponding to a second grayscale value can be provided to a second gamma voltage line.

The digital-to-analog conversion circuit 220 can comprise a plurality of switches 222 respectively connected to a plurality of gamma voltages Vgm. The plurality of switches 222 can control the connection between each gamma voltage line 221 and the output terminal of the digital-analog conversion circuit 220.

The digital-to-analog conversion circuit 220 can convert a digital signal into an analog signal by selecting and outputting one gamma voltage from among a plurality of gamma voltages Vgm using a plurality of switches 222.

The on/off of the plurality of switches 222 can be determined according to a digital signal. One of the plurality of gamma voltages Vgm can be determined as an analog signal according to the on/off state of the plurality of switches 222.

The plurality of switches 222 can change their on/off state whenever a new digital signal is received. For example, a digital signal can be output from the latch circuit 210 according to the latch output signal LT. The on/off state of the plurality of switches 222 can be changed at the time when such a digital signal is output.

At the time when the plurality of switches 222 change their on/off state, relatively large power is consumed and noise can occur in the output signal of the digital-to-analog conversion circuit 220.

The buffer circuit 230 can control the magnitude of the bias current or bias voltage in order to block the propagation of such noise.

The buffer circuit 230 can amplify the analog signal output from the digital-to-analog conversion circuit 220 while varying the size of the bias current or bias voltage within one horizontal time period to generate the data voltage Vd for driving the pixel P. The buffer circuit 230 can reduce the magnitude of the bias current or bias voltage during a first time period of one horizontal time period, and restore the magnitude of the bias current or bias voltage to the original state again at a second time period subsequent to the first time period.

When the timing control circuit 250 outputs the latch output signal LT, a digital signal is output from the latch circuit 210, and at the time when the digital signal is output, the on/off state of the switches 222 of the digital-to-analog conversion circuit 220 can be changed. As described above, the aforementioned noise can be generated when the switches 222 change their on/off states. According to the embodiment, the buffer circuit 230 can reduce the magnitude of the bias current or bias voltage for the first time period from the time point when the switches 222 of the digital-to-analog conversion circuit 220 change the on/off state, thereby blocking propagation of noise generated from the digital-to-analog conversion circuit 220. According to an embodiment, the buffer circuit 230 can block the propagation of noise by reducing the magnitude of the bias current or bias voltage for the first time period from the time point at which the digital signal is output from the latch circuit 210. According to the embodiment, the buffer circuit 230 can reduce the magnitude of the bias current or bias voltage for a first time period from the time point at which the analog signal is output from the digital-to-analog conversion circuit 220, thereby blocking the propagation of noise.

The buffer circuit 230 can receive a bias voltage Vbias and amplify an analog signal using the bias voltage Vbias. However, if the buffer circuit 230 uses the bias current or bias voltage too rapidly during this amplification process, noise having a large intensity can be generated in the ground GND.

The buffer circuit 230, the latch circuit 210, and the digital-to-analog conversion circuit 220 can share a ground GND. If the above-mentioned noise is generated, the noise is propagated through the shared ground GND, and additional problems can occur.

The data driving device 110 can comprise an output switch 240 for minimizing propagation of noise.

The output switch 240 can control the connection between the data line DL connected to the pixel P and the buffer circuit 230.

The timing control circuit 250 can generate an output enable signal OP_EN for controlling on/off of the output switch 240. The output enable signal OP_EN can turn off the output switch 240 during a part of the horizontal time period and turn on the output switch 240 during the remaining time. As an example, the timing control circuit 250 can turn off the output switch 240 for a first time period from the time point at which the digital signal is output through the output enable signal OP_EN. As another example, the timing control circuit 250 can turn off the output switch 240 for a first time period from the time when the latch output signal LT is generated through the output enable signal OP_EN. Accordingly, the data voltage Vd to be supplied to the pixel P can be delayed.

Control of the output switch 240 and the size of the bias current or bias voltage of the aforementioned buffer circuit 230 can operate in synchronization. When the output switch 240 is turned off, the buffer circuit 230 can reduce the magnitude of the bias current or bias voltage, and when the output switch 240 is turned on, the buffer circuit 230 can increase the bias current or bias voltage. In another aspect, the buffer circuit 230 can vary the magnitude of the bias current or bias voltage according to the output enable signal OP_EN.

The timing control circuit 250 can vary the waveform of the output enable signal OP_EN according to the mode. In the first mode, the timing control circuit 250 may not transmit the output enable signal OP_EN or can keep the output switch 240 turned on during the horizontal time period through a waveform having a constant voltage level. In this first mode, the buffer circuit 230 may not vary the size of the bias current or bias voltage. In the second mode, the timing control circuit 250 can transmit the output enable signal OP_EN to turn off the output switch 240 during a part of the horizontal time period as described above. In this second mode, the buffer circuit 230 can reduce the magnitude of the bias current or bias voltage for a part of the horizontal time period.

Figure 3:
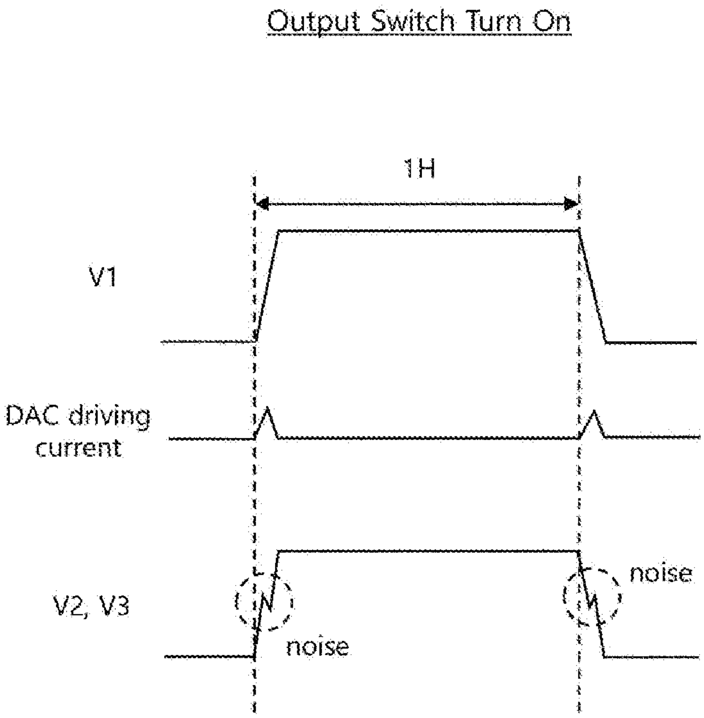
FIG. 3 is a diagram for explaining noise that can appear in a first mode.

FIG. 3 is a diagram for explaining noise that can appear in a first mode.

The waveform shown in FIG. 3 is those for the output voltage (V1 in FIG. 2) of the digital-to-analog conversion circuit 220, the driving current supplied to the digital-to-analog conversion circuit 220, the voltage (V2 in FIG. 2) of the terminal on the side of the buffer circuit 230 in the output switch 240 and the voltage (V3 in FIG. 2) of the terminal of the side of the pixel P in the output switch 240.

Referring to FIGS. 2 and 3, when a new horizontal time period 1H starts and the digital-to-analog conversion circuit 220 converts a digital signal into an analog signal, it can be seen that noise is generated in the driving current of the digital-to-analog conversion circuit 220 according to the state change of the switches 222.

In the first mode, the output switch 240 can be constantly turned on. Accordingly, it can be seen that the noise of the digital-to-analog conversion circuit 220 also affects the voltage V2 corresponding to the output of the buffer circuit 230 and the terminal voltage V3 of the side of the pixel in the output switch 240.

Since the noise appearing in the terminal voltage V3 of the side of the pixel in the output switch 240 is also transmitted to the pixel P, in the first mode, the image quality can deteriorate due to such noise.

Figure 4:
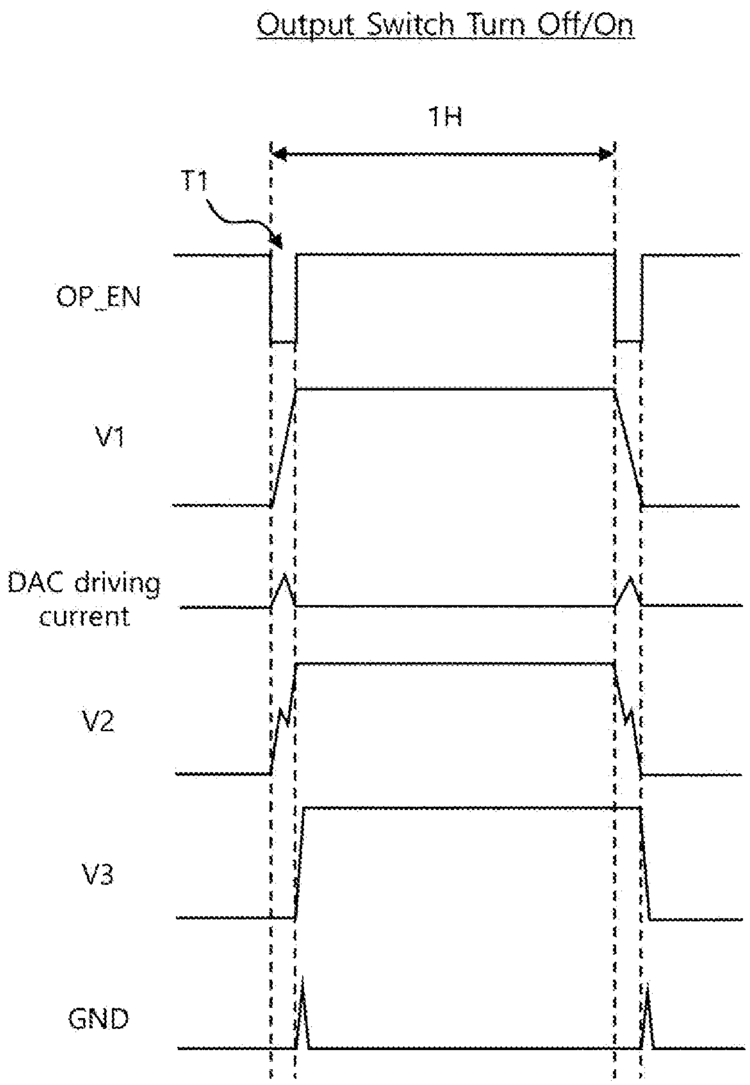
FIG. 4 is a diagram for explaining noise that can appear when there is no output switch in a second mode.

FIG. 4 is a diagram for explaining noise that can appear when there is no output switch in a second mode.

Referring to FIGS. 2 and 4, when a new horizontal time period 1H starts and the digital-to-analog conversion circuit 220 converts a digital signal into an analog signal, noise can occur in the driving current of the digital-to-analog conversion circuit 220 according to the state change of the switches 222.

In order to block such noise from being transmitted to the pixel P, the output switch 240 can be turned off for a first time period T1 through the output enable signal OP_EN.

Referring to FIG. 4, it can be seen that as the output switch 240 is turned off, the noise of the digital-to-analog conversion circuit 220 can appear in the voltage V2 corresponding to the output of the buffer circuit 230, but the noise of the digital-to-analog conversion circuit 220 does not appear in the terminal voltage V3 of the side of the pixel in the output switch 240.

However, after the first time period T1, the output signal of the buffer circuit 230 can be suddenly transferred to the pixel P, and new noise can be generated on the ground. The output switch 240 can be turned off for a first time period T1. At this time, the buffer circuit 230 can produce an output in a no-load state—a state in which the connection between the buffer circuit 230 and the parasitic capacitor is released. In this state, if the output switch 240 is suddenly turned on, a phenomenon in which the output current of the buffer circuit 230 is supplied to the parasitic capacitor and rapidly increases can occur. This phenomenon is also called inrush current phenomenon.

Figure 5:
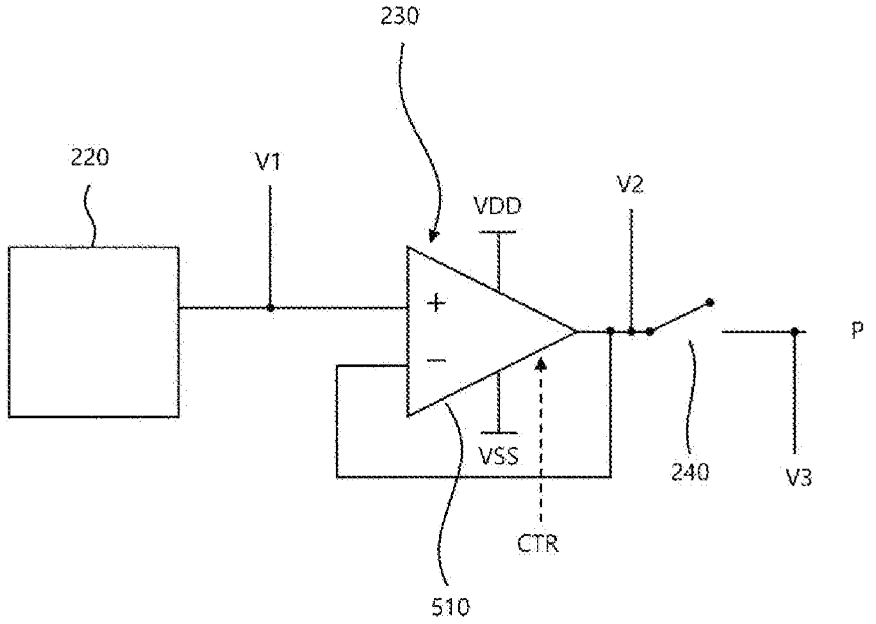
FIG. 5 is a first diagram showing the configuration of a buffer circuit according to an embodiment.

If new noise is generated in the ground by such an inrush current, a problem can occur in image quality, etc., as fluctuations occur in other devices 120 and 150 that share the ground. To solve this problem, the buffer circuit 230 can vary the magnitude of the bias current or bias voltage within one horizontal time period 1H. FIG. 5 is a first diagram showing the configuration of a buffer circuit according to an embodiment.

Referring to FIGS. 2 and 5, the buffer circuit 230 can comprise an amplifier 510.

The first input terminal of the amplifier 510—for example, a minus input terminal—can be electrically connected to an output terminal thereof. According to this connection relationship, the amplifier 510 can function as a buffer.

The second input terminal of the amplifier 510—for example, the plus input terminal—can be electrically connected to an output terminal of the digital-analog conversion circuit 220.

The output terminal of the amplifier 510 can be connected to the pixel P through the output switch 240.

A first voltage VDD and a second voltage VSS can be supplied to the amplifier 510. The first voltage VDD can be greater than the second voltage VSS. The amplifier 510 can vary the bias voltage between the first voltage VDD and the second voltage VSS and amplify the analog signal.

A control signal CTR can be supplied to the amplifier 510. The amplifier 510 can vary the magnitude of the bias current or bias voltage according to the control signal CTR. Meanwhile, the amplifier 510 can vary a slew rate in the same manner as varying the magnitude of the bias current or bias voltage. The slew rate in an amplifier can mean the maximum speed at which it can respond to a sudden change in input level. The amplifier 510 according to an embodiment can vary the slew rate within one horizontal time period. For example, the amplifier 510 can decrease the slew rate during a first time period of one horizontal time period according to the control signal CTR, and increase the slew rate again at a second time period subsequent to the first time period.

Figure 6:
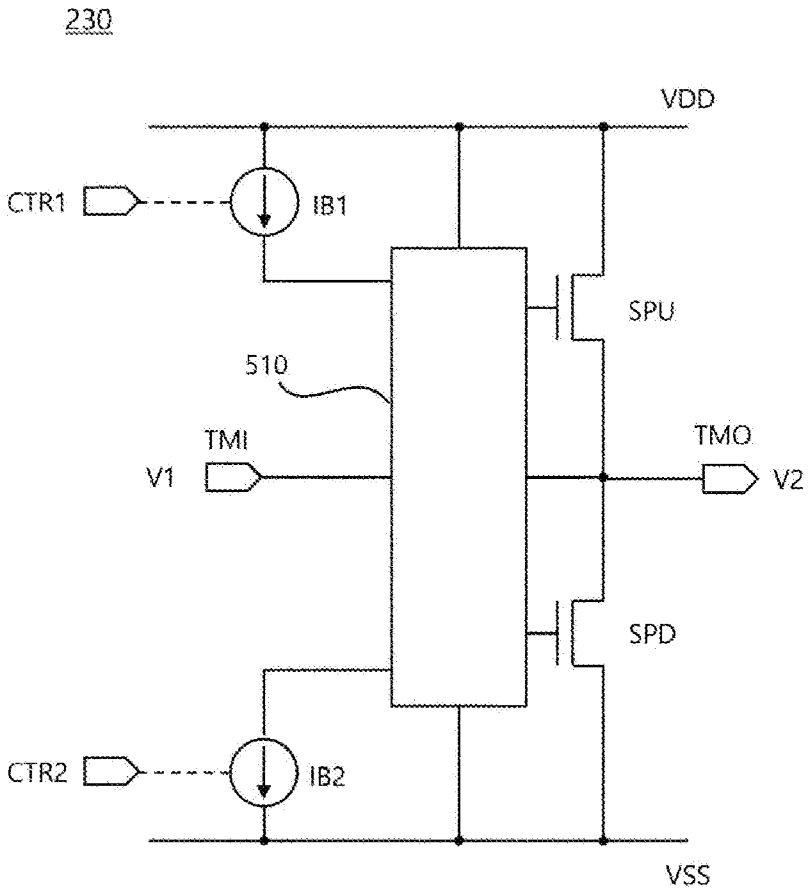
FIG. 6 is a second diagram showing the configuration of a buffer circuit according to an embodiment.

FIG. 6 is a second diagram showing the configuration of a buffer circuit according to an embodiment.

Referring to 2 and 6, the buffer circuit 230 can comprise a pull-up transistor SPU, a pull-down transistor SPD, a control circuit 510, a first bias current source IB1, a second bias current source IB2, etc. The control circuit 510 can be the amplifier 510 shown in FIG. 5 or included in the amplifier 510.

The pull-up transistor SPU can be disposed between a line of a first voltage VDD and a line of an output terminal TMO to supply current to an output terminal TMO. The pull-down transistor SPD is disposed between a line of a second voltage VSS and the output terminal TMO to receive current from the output terminal TMO.

The control circuit 510 can control a gate terminal of the pull-up transistor SPU and a gate terminal of the pull-down transistor SPD according to the voltage V1 input to an input terminal TMI. At this time, the control circuit 510 can receive a bias current or bias voltage for control from the first bias current source IB1 and the second bias current source IB2.

The magnitude of the bias current or bias voltage can affect the magnitude of the slew rate. When the magnitude of the bias current or bias voltage increases, the slew rate can increase, and when the magnitude of the bias current or bias voltage decreases, the slew rate can decrease.

The magnitude of the bias current or bias voltage can be determined by the control signals CTR1 and CTR2. The control signals CTR1 and CTR2 can be referred to as bias voltages. The control signals CTR1 and CTR2 or the bias voltage can be received from the outside of the buffer circuit 230.

The bias current or bias voltage can be varied according to the control signals CTR1 and CTR2. The magnitude of the bias current or bias voltage at the first time period of one horizontal time period can be controlled to a first magnitude, and the magnitude of the bias current or bias voltage at a second time period of one horizontal time period can be controlled to a second magnitude. The second time period is a time period subsequent to the first time period, and the first magnitude can be a value smaller than the second magnitude.

Figure 7:
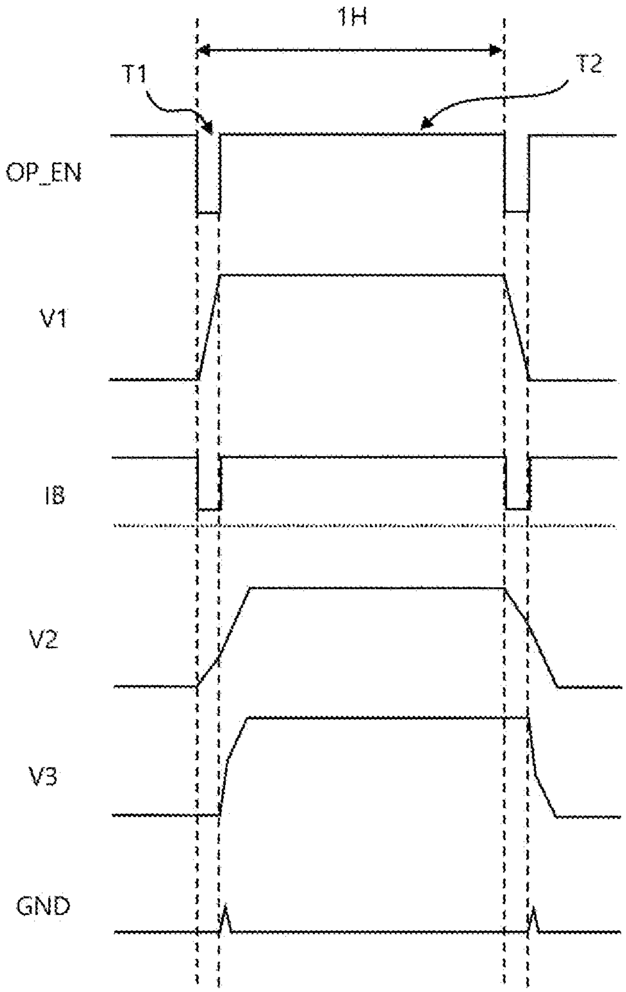
FIG. 7 is a diagram showing a main waveform of the buffer circuit shown in FIGS. 5 and 6.

FIG. 7 is a diagram showing a main waveform of the buffer circuit shown in FIGS. 5 and 6.

Referring to FIGS. 2 and 7, a new horizontal time period 1H can start, and the digital-to-analog conversion circuit 220 can convert a digital signal into an analog signal according to the latch output signal LT and output the converted analog signal. In FIG. 7, the first voltage V1 is the voltage corresponding to the analog signal.

The digital-to-analog conversion 220 can perform or complete the conversion operation within the first time period T1 from the start of the horizontal time period 1H. Noise can occur in this conversion operation. In order to block the propagation of such noise, the output switch 240 can be turned off for a first time period T1 after a new horizontal time period 1H starts by using the output enable signal OP_EN.

The buffer circuit 230 can reduce the magnitude of the bias current IB or bias voltage for the first time period T1. During the first time period T1, the bias current IB or the bias voltage decreases, and the output voltage V2 of the buffer circuit 230 can change gently.

Since the output switch 240 is turned off for the first time period T1, the terminal voltage V3 of the side of the pixel in the output switch 240 can maintain the voltage of the previous horizontal time period.

At a second time period T2 following the first time period T1, the output switch 240 can be turned on to supply the data voltage to the pixel P. In order to enhance the dynamic characteristics of the data voltage supplied to the pixel P, the buffer circuit 230 can increase the bias current IB or the bias voltage during the second time period T2.

As the bias current IB or the bias voltage increases, the output voltage V2 of the buffer circuit 230 can rapidly change. Noise can occur in the ground due to such rapid fluctuations. However, since the buffer circuit 230 is operated in a low bias state during the first time period T1, the amount of change in the output voltage V2 during the second time period T2 can be relatively small. Accordingly, the size of noise generated in the ground can be smaller than that shown in FIG. 4.

As described above, according to the embodiment, it is possible to minimize the generation of noise due to instantaneous power consumption or to reduce the intensity of such noise. In addition, according to the embodiment, it is possible to block or minimize the propagation of such noise. In addition, according to the embodiment, by minimizing the influence of such noise, it is possible to minimize the defect of the display device, in particular, the image quality defect.

What is claimed is:

1. A data driving device, comprising:

a latch circuit configured to store pixel image data;

a digital-to-analog conversion circuit configured to convert, within one horizontal time period, a digital signal corresponding to the pixel image data into an analog signal for driving a pixel using a plurality of gamma voltages, wherein the one horizontal time period includes a first time period at a start of the one horizontal time period and a second time period subsequent to the first time period;

a buffer circuit configured to vary a magnitude of a bias current within the one horizontal time period and to transfer the analog signal to the pixel; and an output switch configured to control a connection between a data line connected to the pixel and the buffer circuit during the one horizontal time period in order to block propagation of a noise in the digital-to-analog conversion circuit during the first time period, wherein the buffer circuit is configured to reduce the magnitude of the bias current to a non-zero magnitude while the output switch is turned off during the first time period of the one horizontal time period and to increase the magnitude of the bias current while the output switch is turned on during the second time period of the one horizontal time period.

2. The data driving device of claim 1, further comprising a timing control circuit configured to generate a latch output signal at every horizontal time period, wherein the latch circuit is configured to output the digital signal according to the latch output signal, and wherein the buffer circuit is configured to reduce the magnitude of the bias current during the first time period from a time point at which the digital signal is output.

3. The data driving device of claim 2, wherein the timing control circuit is further configured to generate an output enable signal for controlling an on/off state of the output switch, and wherein the output switch is configured to be turned off for the first time period from the time point at which the digital signal is output according to the output enable signal.

4. The data driving device of claim 3, wherein the buffer circuit is configured to vary the magnitude of the bias current according to the output enable signal.

5. The data driving device of claim 1, wherein the digital-to-analog conversion circuit comprises a plurality of switches connected to the plurality of gamma voltages, respectively, wherein an on/off state of the plurality of switches is determined according to the digital signal, and wherein one of the plurality of gamma voltages is determined as the analog signal according to the on/off state of the plurality of switches.

6. The data driving device of claim 1, wherein the latch circuit, the digital-to-analog conversion circuit, and the buffer circuit are configured to share a ground.

7. The data driving device of claim 1, wherein a parasitic capacitor is formed in the data line, and wherein, a connection between the buffer circuit and the parasitic capacitor is released as a result of the output switch being turned off.

8. The data driving device of claim 1, wherein in a first mode, the output switch is configured to be continuously turned on for a horizontal time period, and wherein in a second mode, the output switch is configured to be turned off for a part of the one horizontal time period.

9. The data driving device of claim 8, wherein the buffer circuit is configured to reduce the magnitude of the bias current while the output switch is turned off.

10. A data driving device, comprising:

a digital-to-analog conversion circuit configured to convert, within one horizontal time period, a digital signal for a grayscale value into an analog signal for driving a pixel, wherein the one horizontal time period includes a first time period at a start of the one horizontal time period and a second time period subsequent to the first time period;

a buffer circuit, wherein the buffer circuit is configured:

to control a magnitude of a bias current to a first magnitude at the first time period of the one horizontal time period, to control the magnitude of the bias current to a second magnitude at the second time period of the one horizontal time period, and to transfer the analog signal to the pixel; and an output switch configured to control an electrical connection between an output terminal of the buffer circuit and the pixel during the one horizontal time period in order to block propagation of a noise in the digital-to-analog conversion circuit during the first time period, wherein the buffer circuit is configured to reduce the magnitude of the bias current to a non-zero magnitude while the output switch is turned off during the first time period of the one horizontal time period and to increase the magnitude of the bias current while the output switch is turned on during the second time period of the one horizontal time period.

11. The data driving device of claim 10, wherein the output switch is configured to be turned off so that the analog signal is delayed and supplied to the pixel.

12. The data driving device of claim 11, wherein the second time period is a time period subsequent to the first time period, and wherein the first magnitude is a value smaller than the second magnitude.

13. The data driving device of claim 10, wherein the digital-to-analog conversion circuit is configured to complete a conversion operation of the digital signal into the analog signal during the first time period.

14. The data driving device of claim 13, wherein the digital-to-analog conversion circuit is configured to convert the digital signal into the analog signal by selecting one gamma voltage from among a plurality of gamma voltages using a plurality of switches.

15. The data driving device of claim 10, wherein the digital-to-analog conversion circuit and the buffer circuit are connected using a ground.

16. A data driving device, comprising:

a digital-to-analog conversion circuit configured to convert, within one horizontal time period, a digital signal for a grayscale value into an analog signal for driving a pixel, wherein the one horizontal time period includes a first time period at a start of the one horizontal time period and a second time period subsequent to the first time period;

a buffer circuit configured to amplify the analog signal using an amplifier while varying a slew rate of the amplifier within the one horizontal time period; and an output switch configured to control an electrical connection between an output terminal of the buffer circuit and the pixel during the one horizontal time period in order to block propagation of a noise in the digital-to-analog conversion circuit during the first time period, wherein the buffer circuit is configured to reduce the slew rate to a non-zero slew rate while the output switch is turned off during the first time period of the one horizontal time period.

17. The data driving device of claim 16, wherein the output switch is configured to be turned off for the first time period so that the analog signal is delayed and supplied to the pixel.

18. The data driving device of claim 17, wherein the buffer circuit is configured to increase the slew rate of the amplifier at the second time period subsequent to the first time period.

* * * * *